US011593025B2

United States Patent
(12) United States Patent (10) Patent No.: US 11,593,025 B2

Ramagiri et al. (45) Date of Patent: Feb. 28, 2023

(54) WRITE OPERATION STATUS

(71) Applicant: Arm Limited, Cambridge (GB)

(72) Inventors: Gurunath Ramagiri, Austin, TX (US); Jamshed Jalal, Austin, TX (US); Mark David Werkheiser, Austin, TX (US); Tushar P Ringe, Austin, TX (US); Klas Magnus Bruce, Leander, TX (US); Ritukar Khanna, Austin, TX (US)

(73) Assignee: Arm Limited, Cambridge (GB)

( * ) Notice: Subject to any disclaimer, the term of this patent is extended or adjusted under 35 U.S.C. 154(b) by 15 days.

(21) Appl. No.: 16/743,409

(22) Filed: Jan. 15, 2020

(65) Prior Publication Data

US 2021/0216241 A1 Jul. 15, 2021

(51) Int. Cl.
*G06F 3/06* (2006.01)

(52) U.S. Cl.
CPC .......... *G06F 3/0659* (2013.01); *G06F 3/0611* (2013.01); *G06F 3/0673* (2013.01)

(58) Field of Classification Search
CPC ..... G06F 3/0659; G06F 3/0611; G06F 3/0673
See application file for complete search history.

(56) References Cited

U.S. PATENT DOCUMENTS 9,432,298 B1 * 8/2016 Smith ................. H04L 49/9057
10,133,513 B1 * 11/2018 Agans .................. G06F 12/084
2005/0172084 A1 * 8/2005 Jeddeloh ............ G06F 13/1642 711/154
2011/0185117 A1 * 7/2011 Beeston ................ G06F 3/0652 711/111
2013/0003546 A1 * 1/2013 Matthews ........... H04L 43/0894 370/231
2017/0177262 A1 * 6/2017 Sharma ................. G06F 3/0634
2017/0277554 A1 * 9/2017 Oehrlein ............. H04L 41/0893

OTHER PUBLICATIONS

A screen shot of the definition of indicate from cambridgedictionary.com taken by the wayback archive machine in 2019. (Year: 2019).*
A Google Could article describing rate limiting, including a pass through mode taken by the wayback machine in 2019 from cloud.google.com/solutions/rate-limiting-strategies-techniques (Year: 2019).*

* cited by examiner

*Primary Examiner* — William E. Baughman
*Assistant Examiner* — Janice M. Girouard
(74) *Attorney, Agent, or Firm* — Nixon & Vanderhye P.C.

(57) ABSTRACT

A request node is provided comprising request circuitry to issue write requests to write data to storage circuitry. The write requests are issued to the storage circuitry via a coherency node. Status receiving circuitry receives a write status regarding write operations at the storage circuitry from the coherency node and throttle circuitry throttles a rate at which the write requests are issued to the storage circuitry in dependence on the write status. A coherency node is also provided, comprising access circuitry to receive a write request from a request node to write data to storage circuitry and to access the storage circuitry to write the data to the storage circuitry. Receive circuitry receives, from the storage circuitry, an incoming write status regarding write operations at the storage circuitry and transmit circuitry transmits an outgoing write status to the request node based on the incoming write status.

19 Claims, 6 Drawing Sheets

WRITE OPERATION STATUS

TECHNICAL FIELD

The present disclosure relates to data processing.

DESCRIPTION

In, for instance, an interconnected system, a request node may send one or more requests (e.g. for data) to storage circuitry such as a memory. Where the memory is shared between a number of data processing devices, it may be necessary to provide coherency mechanisms so that the data is not simultaneously edited by multiple data processing devices and so that one data processing device does not use an old version of data. A home node can therefore be provided as a point of coherency within the system. Read and write requests to the storage circuitry from the request node can proceed through the home node and the home node may effectively act as an 'agent' for the request node. However, since the request node may not communicate directly with the storage circuitry, the request node could inadvertently overload the storage circuitry. This could lead to requests being returned, which in turn increases the bandwidth used by the system.

SUMMARY

Viewed from a first example configuration, there is provided a request node comprising: request circuitry to issue write requests to write data to storage circuitry, wherein the write requests are issued to the storage circuitry via a coherency node; status receiving circuitry to receive a write status regarding write operations at the storage circuitry from the coherency node; and throttle circuitry to throttle a rate at which the write requests are issued to the storage circuitry in dependence on the write status.

Viewed from a second example configuration, there is provided a method comprising: issuing write requests to write data to storage circuitry, wherein the write requests are issued to the storage circuitry via a coherency node; receiving a write status regarding write operations at the storage circuitry from the coherency node; and throttling a rate at which the write requests are issued to the storage circuitry in dependence on the write status.

Viewed from a third example configuration, there is provided a coherency node comprising: access circuitry to receive a write request from a request node to write data to storage circuitry and to access the storage circuitry to write the data to the storage circuitry; receive circuitry to receive, from the storage circuitry, an incoming write status regarding write operations at the storage circuitry; and transmit circuitry to transmit an outgoing write status to the request node based on the incoming write status.

Viewed from a fourth example configuration, there is provided a method comprising: receiving a write request from a request node to write data to storage circuitry; accessing the storage circuitry to write the data to the storage circuitry; receiving, from the storage circuitry, an incoming write status regarding write operations at the storage circuitry; and transmitting an outgoing write status to the request node based on the incoming write status.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
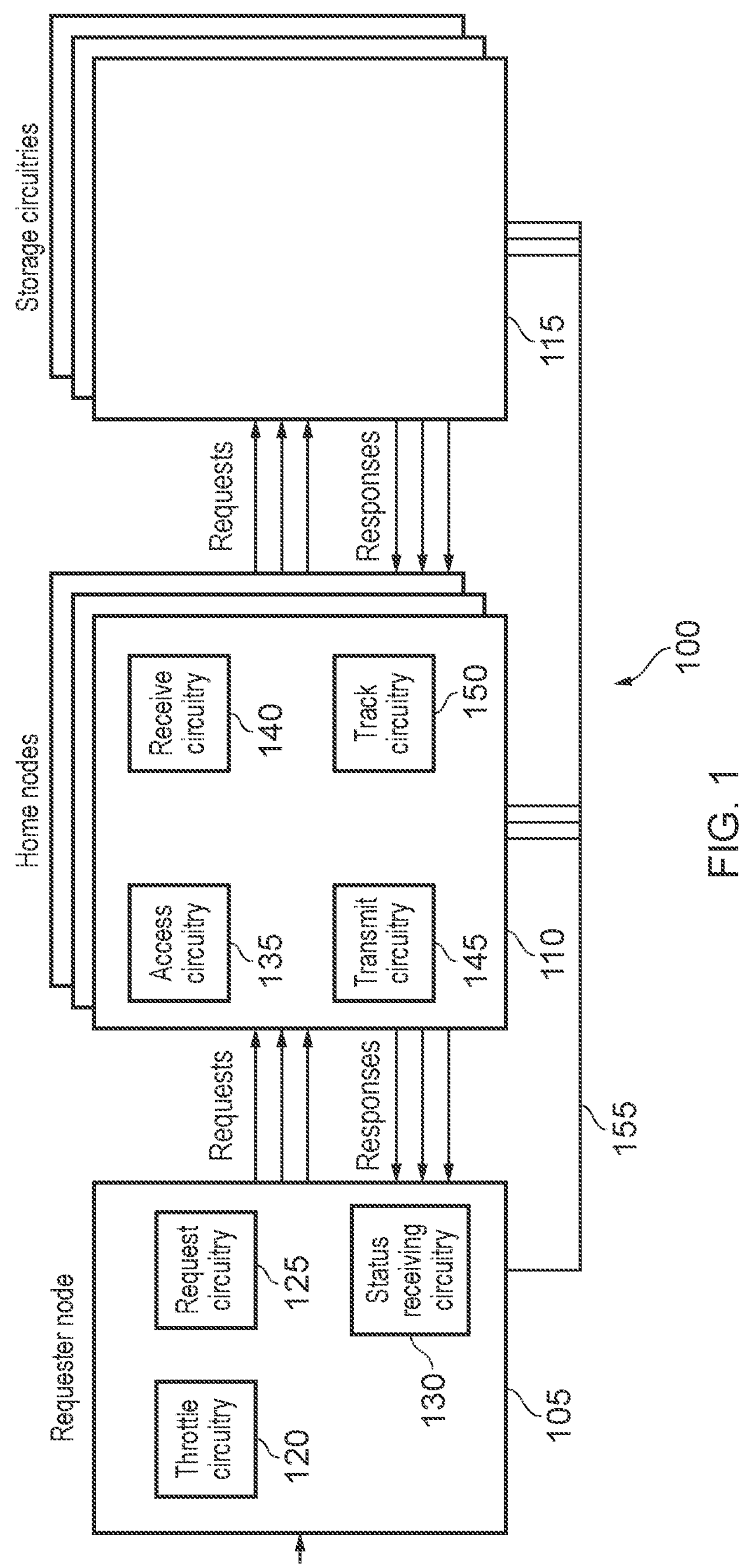
FIG. 1 schematically shows a system comprising a requester node, one or more home nodes, and one or more storage circuitries in accordance with some embodiments.

Before discussing the embodiments with reference to the accompanying figures, the following description of embodiments is provided.

In accordance with one example configuration there is provided a request node comprising: request circuitry to issue write requests to write data to storage circuitry, wherein the write requests are issued to the storage circuitry via a coherency node; status receiving circuitry to receive a write status regarding write operations at the storage circuitry from the coherency node; and throttle circuitry to throttle a rate at which the write requests are issued to the storage circuitry in dependence on the write status.

The coherency node could take the form of a home node for use in an interconnect, for instance. Such a node is generally responsible for managing or helping to manage coherency throughout the interconnected system. In the above aspect, the request node could take the form of a CPU or part of a CPU such as the load/store unit. The request node is responsible for issuing write requests to storage circuitry such as a main memory or a cache. The write requests are sent via the coherency node in order to provide coherency between this write request as well as other requests that may be being made by other request nodes in the system. The coherency node transmits a write status to the request node. The write status can take a number of different forms. One form that the write status is able to take concerns the status of write operations at the storage circuitry. Having received such information, the write requests that are issued by the request node can be throttled based on the write status. In this way, it is possible to respond to changes in the number of write operations within the storage circuitry. For instance, as the number of requests increases, the amount of throttling can increase so as to avoid the system being negatively affected.

In some examples, the write status indicates a number of write operations being processed by the storage circuitry. The indication of the number of write operations being processed by the storage circuitry need not be an absolute number. Instead, in some examples, the indication of the number of write operations being processed in the storage circuitry corresponds with a range. For instance, the indication could be that a "high" number of operations are being processed with the indicator (high) corresponding to 24 or more waiting operations at the time that the write status was determined (in a system where the request tracker can track a maximum of 32 requests). Note that the number of write operations being processed need not correspond with the current number of write operations actively being performed at the time the write status was determined. Instead, this could correspond with a number of queued write operations that were queued at the request circuitry at the time that the write status was determined.

In some examples, the number of write operations is determined within a window of time. The number of write operations could be calculated as a number of write operations that are performed within a window of time. In other embodiments, the window of time is divided into a number of periods and the number of write operations is calculated as the average number of operations being processed, that are processed, or that are queued, each period within the window of time. For instance, a period could span 20 milliseconds within a window of 200 milliseconds, and the number of write operations performed or the number of write operations that are waiting could be calculated during each of these periods and averaged over the total of the periods.

In some examples, the request circuitry is adapted to issue each of the write requests to one of a plurality of storage circuitries; the status receiving circuitry is adapted to receive a plurality of write statuses from the storage circuitries; and the throttle circuitry is adapted to throttle a rate at which the write requests are sent to each of the storage circuitries in dependence on a corresponding one of the write statuses. A number of different storage circuities can be provided including the storage circuitry previously described. In such situations, each of the storage circuitries may send its own write status to the requester node via the home node (or home nodes). Accordingly, the throttle circuitry may be used in order to throttle the write requests that are sent to a specific storage circuitry based on the write status of that storage circuitry. In this way, it is possible to throttle the write requests that are sent to one storage circuit without throttling the requests that are sent to another storage circuitry that may otherwise be underused. Consequently, throttling can be restricted to situations where it is necessary either because of the behaviour of the requester node or the behaviour of other requester nodes in the system.

In some examples, the request circuitry is adapted to issue read requests to read data from the storage circuitry; the status receiving circuitry is adapted to receive a read status regarding read operations at the storage circuitry; and the throttle circuitry is adapted to throttle a rate at which the read requests are issued independently of the rate at which the write requests are issued. In addition to determining the write status, the request node is also capable of determining a read status. The read status that is determined is determined in respect of read operations at the storage circuitry (in contrast to the write status which is determined based on write operations at the storage circuitry). Consequently, the read request and write requests are handled separately. The throttle circuitry is able to throttle the rate at which the read requests are issued. This occurs independently of the rate at which the write requests are issued. Consequently, it is possible to throttle either the read requests, or the write requests, or both read and write requests. Such a decision may be taken based on the read status and the write status. This can be important, since in some situations a storage circuit may treat one of these different types of request with different priorities. For instance, in some embodiments, read requests are treated with higher priority than write requests and so may be addressed more quickly by storage circuitry. Accordingly, it may be necessary to throttle one of request without affecting the other type of request.

In some examples, the request circuitry is adapted to issue each of the read requests to one of a plurality of storage circuitries; the status receiving circuitry is adapted to receive a plurality of read statuses from the storage circuitries; and the throttle circuitry is adapted to throttle a rate at which the read requests are sent to each of the storage circuitries in dependence on a corresponding one of the read statuses. In a similar manner to how the write requests are handled, it may be that the request node is able to receive multiple read statuses from each of the multiple storage circuitries. Consequently, the throttling that occurs in respect of the read requests may differ between different storage circuitries. Again, this will be determined based on the behaviour of the request node and also the behaviour of other request nodes. This therefore permits the request node to not only throttle on the basis of read requests and write requests separately, but can also throttle based on the storage circuit to which the requests are being sent.

In accordance with another example configuration, there is provided a coherency node comprising: access circuitry to receive a write request from a request node to write data to storage circuitry and to access the storage circuitry to write the data to the storage circuitry; receive circuitry to receive, from the storage circuitry, an incoming write status regarding write operations at the storage circuitry; and transmit circuitry to transmit an outgoing write status to the request node based on the incoming write status.

Such a coherency node could take the form of a home node for use in an interconnect, for instance. Such a node is generally responsible for managing or helping to manage coherency throughout the interconnected system. In the above aspect, the request node could take the form of a CPU or part of a CPU such as the load/store unit. The write requests are issued by the request node for data to be written into storage circuitry. The requests are issued to the coherency node, which accesses the storage circuitry on behalf of the request node to perform the write operation. The receive circuitry receives an incoming write status from the storage circuitry with the incoming write status indicating write operations at the storage circuitry. The coherency node transmits an outgoing write status to the request node, and the outgoing write status is based on the incoming write status. The status of the write operations can therefore be provided to the request node, which is able to respond by throttling its request rate as appropriate and inhibiting system degradation by limiting the extent to which write requests are sent by the request node.

In some examples, the incoming write status indicates a number of write operations being processed by the storage circuitry. The number of write operations being processed by the storage circuitry could refer to the number of operations that are currently queued at the storage circuitry or could refer to the number of operations that are actually processed. For instance, this could correspond with the number of write operations that have been received by the storage circuitry that have not yet been responded to.

In some examples, the number of write operations is determined within a window of time. In such examples, as explained above, the number of write operations can correspond with the number of completed operations or waiting operations within a period of time. For instance, this could relate to the number of operations that are completed within a period of time or could relate to the number of operations that are forwarded to the storage circuitry for resolution within a period of time.

In some examples, the incoming write status is transmitted as part of a response to the write request. There are a number of ways in which the incoming write status can be provided to the coherency node. In some examples, the incoming write status is transmitted every period to the coherency node. In some embodiments, the incoming write status is transmitted to the coherency node as part of a response to a write request that has been made by the coherency node to the storage circuitry. In this way, the incoming write status can be provided without the need for further transmission of messages and therefore without a significant increase in bandwidth in the interconnect. For instance, the response to the write request could be an acknowledgement of the write request or could be a response containing the result of an operation.

In some examples, the coherency node comprises: track circuitry to track a progress of write operations to write to the storage circuitry issued by the coherency node, wherein the transmit circuitry is dynamically controllable to operate in a plurality of write operation transmission modes; in a first of the write operation transmission modes, the transmit circuitry is adapted to transmit the incoming write status as the outgoing write status; and in a second of the write operation transmission modes, the transmit circuitry is adapted to transmit an indication of the write operations to write to the storage circuitry issued by the coherency node as the outgoing write status. There are a number of ways in which the outgoing write status can be generated by the coherency node in order to be forwarded to the request node. In these examples, the manner in which the outgoing write status is generated can be dynamically changed during runtime. This may occur, for instance, as the priorities of different nodes in the network change or could occur as a consequence of a change in behaviour of the coherency node, request node, storage circuitry, or the interconnect system as a whole. In these examples, the coherency node includes track circuitry, the track circuitry is able to track progress of write operations that are issued from the coherency node to the storage circuitry. These write operations may originate from request nodes. Track circuitry can therefore be used to determine the status of write operations that are "in-flight". Within the write operation transmission nodes, the first of these simply transmits the incoming write status as the outgoing write status. In this way, the incoming write status is effectively forwarded as the outgoing write status to the request node. In a second of the write operation transmission nodes, an indication of the write operations that are tracked in the track circuitry is transmitted as the outgoing write status. In these examples, the incoming write status may effectively be disregarded and the write status that is transmitted to the request node is therefore produced on the coherency nodes view of the outstanding write operations. Such a transmission mode may be particularly useful if the coherency node is the only coherency node in the system and therefore is likely to be authoritative regarding the operations that are being performed at the storage circuitry.

In some examples, in a third of the write operation transmission modes, the transmit circuitry is adapted to transmit an average based on: the write operations to write to the storage circuitry issued by the coherency node and the write operations being processed by the storage circuitry, as the outgoing write status. The third write operation transmission mode generates the outgoing write status based on an average of the values reported by the incoming write status and the write operations that are being tracked by the track circuitry. In this way, the outgoing write status is moderated by both a view of the write operations being performed at the storage circuitry produced by the coherency node as well as that from the storage node. The request node is therefore able to react to either or both of the coherency node or the storage circuitry being highly loaded and so can respond to a situation in which the coherency node itself becomes heavily loaded due to a large number of operations being in-flight.

In some examples, in a fourth of the write operation transmission modes, the transmit circuitry is adapted to transmit an indication of the highest of: the write operations to write to the storage circuitry issued by the coherency node and the write operations being processed by the storage circuitry, as the outgoing write status. Similarly to the third of the write operation transmission nodes, the fourth of the write operation transmission nodes considers an aggregation of the view of the write operations that originates from the storage circuitry as well as the view of the write operations from the coherency node. It is therefore possible for the request node to react to either or both of the storage circuitry and the coherency node having a high loading from outstanding requests.

In some examples, the access circuitry is adapted to receive a read request from a request node to read data from storage circuitry and to access the storage circuitry to read the data to the storage circuitry; the receive circuitry is adapted to receive, from the storage circuitry, an incoming read status regarding read operations at the storage circuitry; and the transmit circuitry is adapted to transmit an outgoing read status to the request node based on the incoming read status. As well as write requests, the coherency node is also able to handle read requests from the request node. In such examples, an incoming read status is received from the storage circuitry regarding read operations at the storage circuitry. An outgoing read status can then be generated and transmitted to the request node based on the incoming read status. It is therefore possible to consider two separate statuses—one of read and one for write operations. This information can be used to react to the control of the two different types of operation separately.

In some examples, the incoming read status is transmitted as part of a response to the read request. As with the incoming write status, the incoming read status can also be transmitted as part of a response to a read request issued by the coherency node. In some embodiments, the incoming read status could also be transmitted periodically by the storage circuitry to the coherency node. By transmitting the incoming read status as part of a response to the read request (such as an acknowledgement or as part of a response containing a result of performing the read operation), the amount of bandwidth used for transmitting the incoming read status can be reduced.

In some examples, the coherency node comprises: track circuitry to track a progress of read operations to read from the storage circuitry issued by the coherency node, wherein the transmit circuitry is dynamically controllable to operate in a plurality of read operation transmission modes; in a first of the read operation transmission modes, the transmit circuitry is adapted to transmit the incoming read status as the outgoing read status; and in a second of the read operation transmission modes, the transmit circuitry is adapted to transmit an indication of the read operations to read from the storage circuitry issued by the coherency node as the outgoing read status. Track circuitry can be provided in order to track the progress of read operations that are issued by the coherency node to the storage circuitry. Such read operations can be considered to be "in-flight". A number of ways in which the outgoing read status can be generated and the coherency node may be dynamically controllable in order to generate the read status in a different manner at run time. Note that the manner in which the read status is generated by the coherency node may be determined independently of how any outgoing write status is generated by the coherency node. Regardless, one way in which the outgoing read status may be generated is simply by providing the incoming read status. Another way in which the outgoing read status can be generated is to transmit an indication of the read operations (e.g. those that are considered to be in-flight) as seen by the track circuitry in the coherency node.

In some examples, in a third of the read operation transmission modes, the transmit circuitry is adapted to transmit an average based on: the read operations to read from the storage circuitry issued by the coherency node and the read operations being processed by the storage circuitry, as the outgoing read status. A third manner in which the outgoing read status can be generated is through an aggregation (e.g. an average) of the read operations that can be determined from the incoming read status and the in-flight read operations that are seen from the track circuitry. This makes it possible to consider the loading of the storage circuitry as seen by the coherency node as well as the loading of the storage circuitry as reported by the storage circuitry itself.

In some examples, in a fourth of the read operation transmission modes, the transmit circuitry is adapted to transmit an indication of the highest of: the read operations to read from the storage circuitry issued by the coherency node and the read operations being processed by the storage circuitry, as the outgoing read status. By considering the highest of the number of read operations that are reported by the incoming read status and the number of read operations that are tracked by the track circuitry at the coherency node, it is possible to react to either of the coherency node or the storage circuitry being heavily loaded.

Particular embodiments will now be described with reference to the figures.

FIG. 1 schematically shows a system 100 comprising a requester node 105, a home nodes 110 (which may be one of several), and storage circuitry 115 (which may also be one of several) in accordance with some embodiments. The requester node 105, the home node 110, and the storage circuitry 115 are connected by an interconnect 155. The requester node 105 receives operations that correspond to access requests for data. The request for the data can originate from part of a CPU such as a load/store unit. In some embodiments, the requester node may be the load/store unit itself or could be a local cache used by the CPU. The access request that is made could be in the form of a read request for data that is stored somewhere within the system 100 or could be a write request for data to be written to a particular address. In this example, the latest version of the requested data is stored in the storage circuitry 115. However, this fact may not be known to the requester node 105. In these examples, it is assumed that the access request is made in respect of a location within the storage circuitry 115. The access request is issued by the request circuitry 125 to the home node 110. Here, the request is received by access circuitry 135 in the home node 110, which accesses the relevant area of the storage circuitry 115 after having determined that this is the location at which the latest version of the data is stored.

The access made by the access circuitry 135 to the relevant storage circuitry 115 is responded to by the storage circuitry 115 issuing a response. This response could take the form of an acknowledgement of the request or could take the form of a response to performing the requested action. The response could be, for instance, the requested data (in the case of a read request) or an indication as to whether the operation was successful (in the case of a write request). In addition, in these examples, the storage circuitry 115 issues a read status or write status to the home node 110. This could, for instance, be part of the response or could be issued periodically from the storage circuitry 115 to the home node 110. The transmit circuitry 145 in the home node 110 then sends a read status or write status to status receiving circuitry 130 in the requester node 105. The read status and/or write status provided by the transmit circuitry 145 are based on the read status and write status issued by the storage circuitry 115. There are a number of ways in which the read status or write status produced by the storage circuitry 115 can be used to produce the read status or write status transmitted by the transmit circuitry 145. Some of these options are discussed in more detail with respect to FIG. 5. In any event, the read status or write status that is received by the status receiving circuitry 130 at the requester node 105 is used to inform the behaviour of the throttle circuitry 120. The throttle circuitry 120 is thereby able to control the extent to which requests are sent by the request circuitry 125 of the requester node 105. For instance, in response to receiving a write status, the throttle circuitry 120 may make the decision to permit or restrict further write requests to be issued from the request circuitry 125. These may be permitted independently of read requests that are issued by the request circuitry 125. For instance, it may be that in the absence of any read status that is received by the status receiving circuitry 130, the throttle circuitry 120 throttles the rate at which write requests are issued by the request circuitry 125, but takes no action in respect of read requests issued by the request circuitry 125. The reverse is also true in respect of a situation in which no write status is received but a read status is received.

In the schematic shown in FIG. 1, it will be noted that a plurality of home nodes and a plurality of storage circuitries are shown. In such a system 100 a requester node 105 can issue requests to a plurality of different home nodes and the home nodes may be connected to a plurality of storage circuitries. The throttle circuitry 120 can behave differently for each storage circuitry 115. Such a system 100 could also contain a plurality of requester nodes 105.

Figure 2:
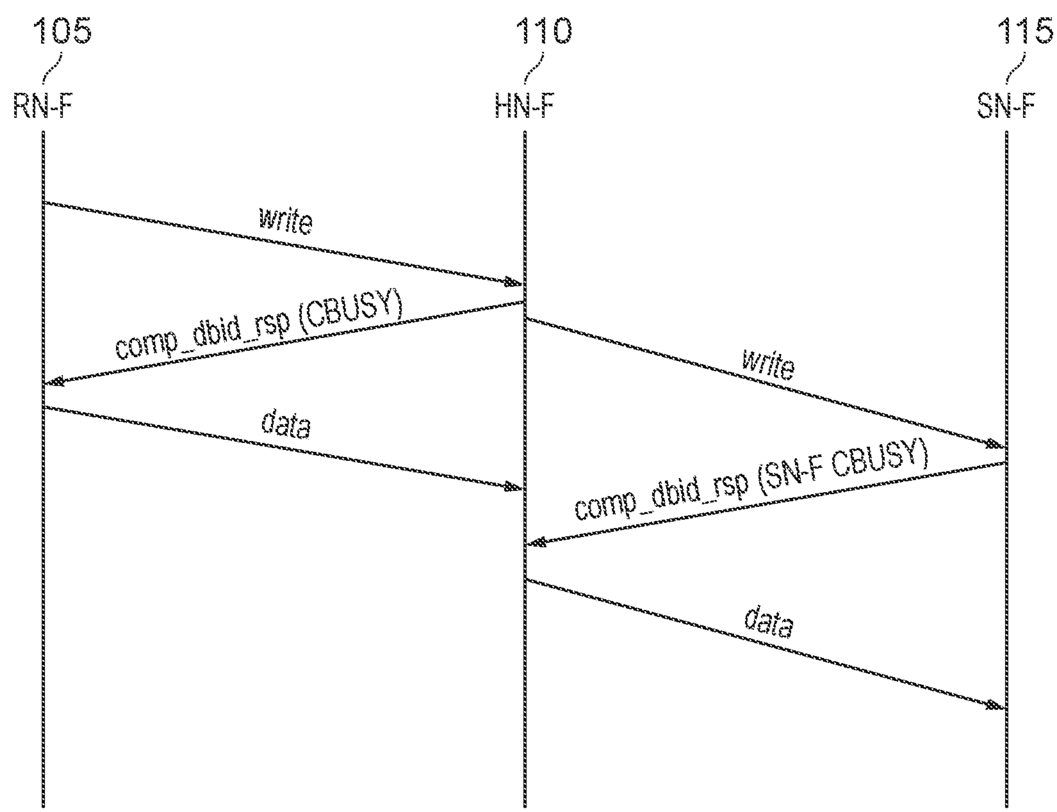
FIG. 2 illustrates the exchange of messages between a requester node, a home node, and a slave node during a write request in accordance with some embodiments.

FIG. 2 illustrates the exchange of messages between a requester node 105, a home node 110, and a slave node 115 (which is an example of the storage circuitry). The figure is arranged such that time increases in a downwards direction. The process begins with the requester node 105 issuing a write request to the home node 110. The write request will include the location to which data is to be written. The home node 110 responds to this write request by issuing a comp_dbid_rsp message back to the requester node 105. This acts as an acknowledgement of the write request and signals the requester node 105 to supply the data that is to be written. In addition, this message contains a CBUSY field, which indicates a busyness level as determined by the home node in respect of write operations. This busyness level can be calculated as an instantaneous reading or over a window of time. The busyness level can also be averaged over a period of time. For instance, over a window of 200 milliseconds, the busyness level could be calculated as the average number of pending (or completed) write requests in each 20 millisecond period. In response to this message, the requester node 105 issues the data to the home node 110. The original write request that is issued by the requester node 105 to the home node 110 also causes the home node 110 to issue its own write request to the slave node 115. This write request matches the write request that is issued from the requester node 105 to the home node 110. In the case of multiple slave nodes 115, the home node 110 determines which of the slave nodes the data is to be written to based on the location of the data specified in the write request from the requester node 105 and knowledge of the home node 110 regarding the most up-to-date version of that data is stored within the system. The slave node 115 responds to the write request by issuing a comp_dbid_rsp message. This also includes a CBUSY field, which indicates a busyness of the slave node 115 in respect of, for instance, write requests. As with the home node, the busyness level of the slave node 115 can be calculated as an instantaneous value or can be calculated over a window of time. The busyness information can be stored and/or amalgamated at the home node 110 and later transmitted to the request node 105 as previously shown. The home node 110 responds to this by forwarding the data that was received from the requester node 105 for this request. The throttle circuitry 120 can use the busyness information that is received from the home node to throttle its outgoing write requests as appropriate.

In the above description, the CBUSY data that is forwarded is data that relates to the busyness of the nodes in respect of write operations, and is sent as part of a response message. However, there are a number of different ways in which the data can be sent. Firstly, as previously described, the busyness level could represent pending requests or completed requests and could be calculated as an instantaneous value, over a window of time, or averaged over a window of time. Secondly, there are a number of ways in which the busyness level can be represented. For instance, in some cases, the busyness level is a coarse identifier of busyness rather than a specific count of operations. For instance, the following table could be used to represent busyness depending on the number of operations:

| Busyness level | Number of transactions |
| --- | --- |
| Very busy | 24 or above |
| Medium busy | Above 18 and below 24 |
| Low busy | Above 12 and below 18 |
| Not busy | Up to 12 |

Figure 4:
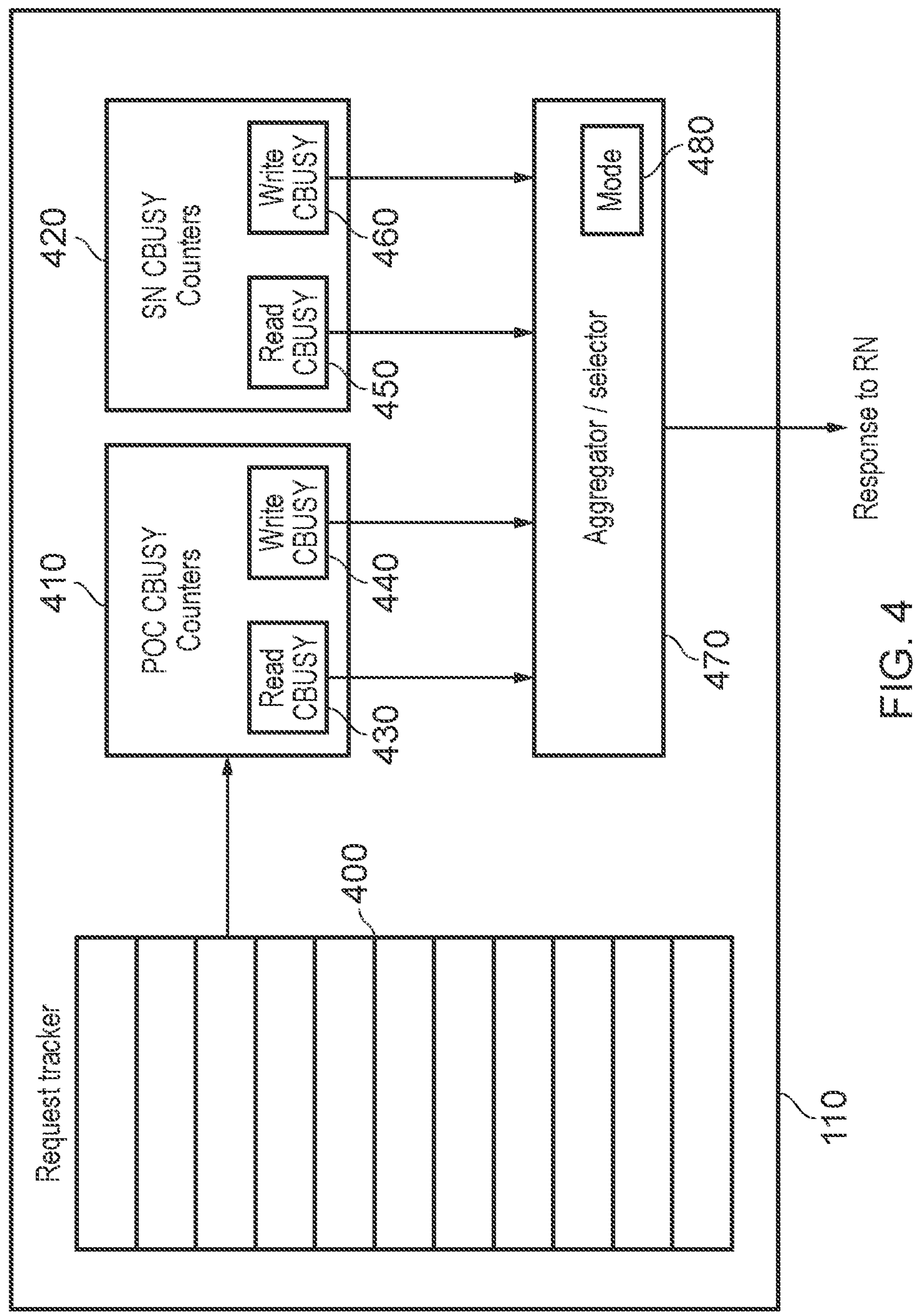
FIG. 4 illustrates a home node 110 in more detail in accordance with some embodiments.
Figure 5:
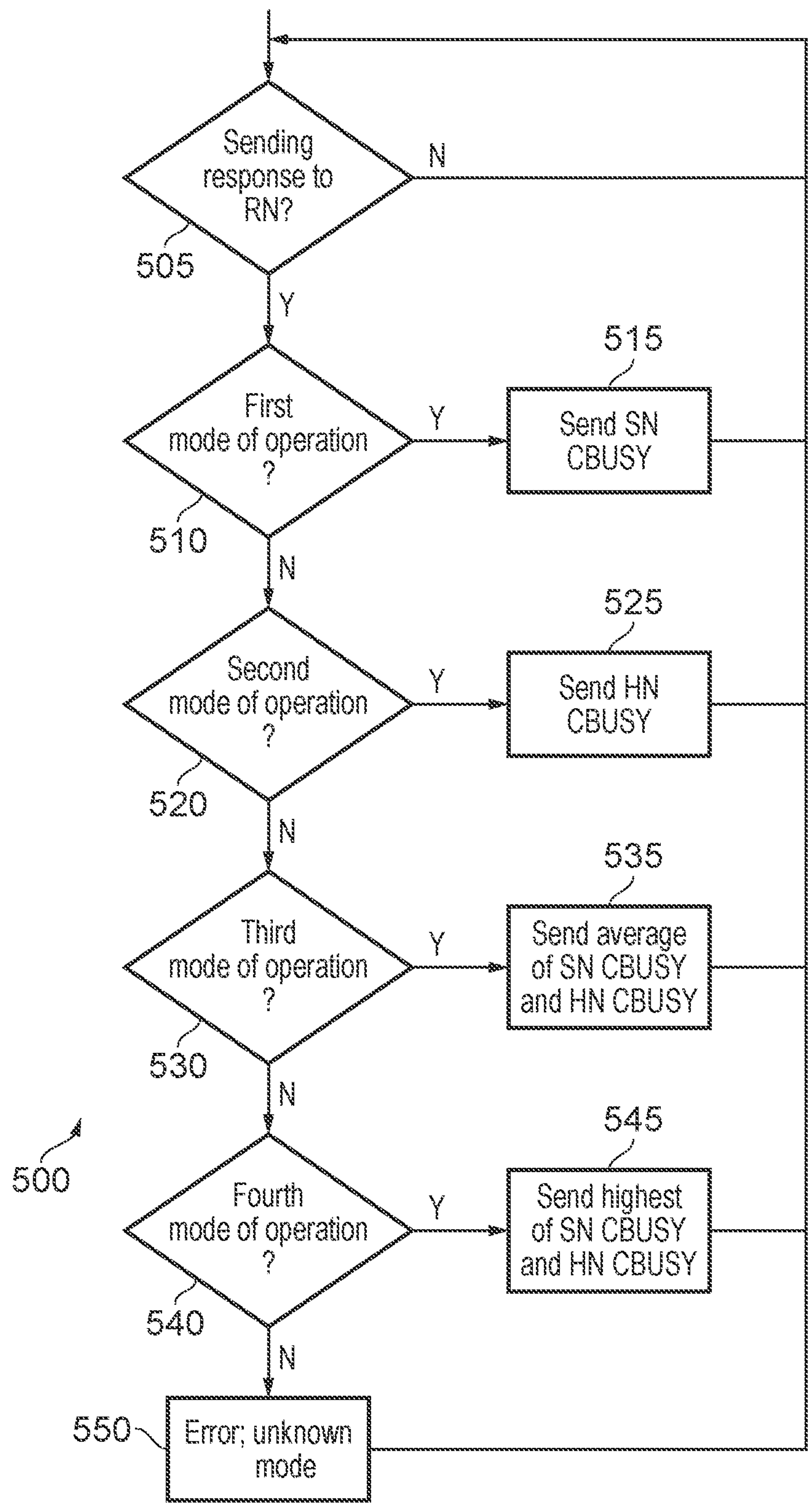
FIG. 5 illustrates a flow chart that shows how the different mode of operations can be used based on the mode register in accordance with some embodiments.

Thirdly, as illustrated with respect to FIGS. 4 and 5, the busyness level can be determined not only on the basis of the slave node 115 but also on the basis of the home node 110 and its requests to the slave node 115. Other options are of course also possible.

All of these options are equally valid for the sending of CBUSY data relating to read requests, which is discussed in the following paragraphs.

Figure 3:
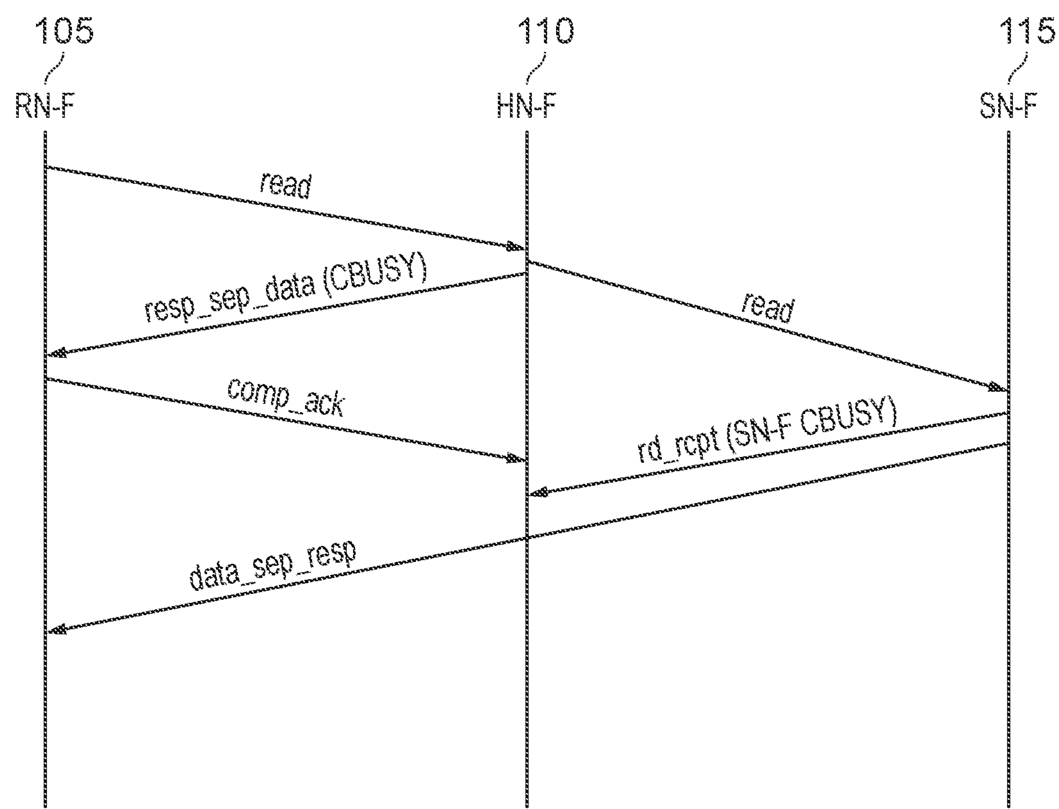
FIG. 3 illustrates the exchange of messages between a requester node, a home node, and a slave node during a read request in accordance with some embodiments.

FIG. 3 shows a similar example that is made in respect of read requests. Here, the request node 105 issues a read request to the home node 110. The read request contains a location of data that is desired by the requester node 105 (e.g. on behalf of a CPU). The home node 110 responds to this in two ways. Firstly, the read request is forwarded from the home node 110 to the slave node 115 that the home mode 110 determines contains the most up-to-date version of the data that has been requested. This can be determined based on the location of the data and the view of the network held by the home node 110. Such information can be determined, for instance, via snooping. Additionally, the home node 110 issues a resp_sep_data message from the home node 110 to the request node 105. This acts as an acknowledgement of the read request. Additionally, this message contains a CBUSY field, which indicates a busyness as determined by the home node 110 in respect of, for instance, read requests. This busyness level can be calculated as an instantaneous reading or over a window of time. The busyness level can also be averaged over a period of time. For instance, over a window of 200 milliseconds, the busyness level could be calculated as the average number of pending (or completed) read requests in each 20 millisecond period. The requester node 105 acknowledges by issuing a comp_ack message to the home node 110. In response to the read request issued to the slave node 115, the slave node 115 issues a rd_rcpt message. This message contains the requested data as well as a CBUSY field. The CBUSY field indicates a busyness of the slave node 115 in respect of read operations. As with the home node, the busyness level of the slave node 115 can be calculated as an instantaneous value or can be calculated over a window of time. This data can again be stored and/or amalgamated at the home node 110. This information is then sent as the CBUSY data in the next resp_sep_data to be sent to the request node 105.

As with the process of obtaining the CBUSY data relating to write operations, there are a number of different ways in which the CBUSY data can be transmitted by the home node 110.

FIG. 4 illustrates an example home node 110 in more detail. The home node 110 includes request tracking circuitry 400, which tracks requests issued by the home node 110 to slave nodes in the system. In this way, the request tracking circuitry 400 is able to track a status of in-flight requests to slave nodes. These requests could be added at a time that the request is issued out to the slave node, and could be deleted when the request is satisfied. This information can therefore be used to populate Point-Of-Coherency (POC) CBUSY counters 410, which represent a busyness of the home node 110 based on requests that it is issuing to the slave nodes. The first 430 of these counters 410 is used for measuring read operations, and the second 440 of these counters 410 is used for measuring write operations. These counters could be incremented based on a window of time. For instance, if the request tracker 400 has access to time at which each request was issued, then these counters could be used to store the number of requests issued within the last x milliseconds. A similar set of counters 420 are provided for storing the CBUSY value received in respect of a particular slave node. Where multiple slave nodes are provided, multiple sets of counters can be used. These counters 420 include a first counter 450 that represents a busyness level of read operations at the slave node as well as a second counter 460 that indicates a busyness of write operations at the slave node. Each of these counters 430, 440, 450, 460 is passed to aggregation/selection circuitry 470 which determines which CBUSY data to send out to the requester node 105. Generally, communications that are sent to the request node 105 in respect of read operations will contain a CBUSY value in relation to one or more of the read CBUSY counters 430, 450 and communications sent to the request node 105 in respect of write operations will contain a CBUSY value based on one or more of the write CBUSY counters 440, 460. A mode register 480 is provided to control a mode of operation that indicates the specific process used to output the CBUSY value. In this way, the specific data provided by the home node 110 can be dynamically changed. Such a change could occur in response to one or more triggers such as an explicit request for different data issued by the requester node 105.

FIG. 5 illustrates a flow chart 500 that shows how the mode register 480 can control the mode of operation. This example considers write status information. A separate mode register 480 could be provided for read status information, or the same register can be used for both the write and read status information. The process for determining the read status is analogous to the process described here for the write status.

At step 505, it is determined whether a message is due to be issued to the request node 105. This could take the form of an explicit response to request node 105 or could be a periodic message sent to the request node 105. If no message is to be sent, then the process returns to step 505. In other words, this step causes the remainder of the process to wait until a response is due to be issued to the request node 105. Once a response is due to be issued to the request node 105, then at step 510, it is determined whether a first mode of operation is indicated by the mode register 480. If so, then the CBUSY value of the slave node, as stored in the slave node CBUSY write register 460 is transmitted in step 515 and the process returns to step 505. If, at step 510, the first mode of operation is not indicated, then at step 520 it is determined whether the second mode of operation is indicated by the mode register 480. If so, then at step 525, the home node CBUSY value is transmitted and the process returns to step 505. This value corresponds with the byte CBUSY counter 440 illustrated with respect of FIG. 4, for instance. If the mode register 480 does not indicate the second mode of operation, then at step 530 it is determined whether the mode register 480 indicates a third mode of operation. If so, then at step 535, the average of the slave node CBUSY value and home node CBUSY values is transmitted and the process returns to step 505. This value can be determined by taking the average value in the two counters 440, 460. This can be calculated as a mean, mode, average, or other form of average that may be known to the skilled person. If the third mode of operation is not indicated by the mode register 480, then at step 540, it is determined whether the fourth mode of operation is indicated by the mode register 480. If so, then at step 545, a highest of the slave node CBUSY value and the home node CBUSY value is transmitted to the requester node and the process returns to step 505. This can be calculated by taking the higher of the two counters 440, 460. If the register 480 does not indicate the fourth mode of operation, then the process proceeds to step 550 where an error is raised due to the mode register indicating an unknown mode of operation. Of course, where other modes of operation are permitted, these are tested for prior to entering the error mode.

Figure 6:
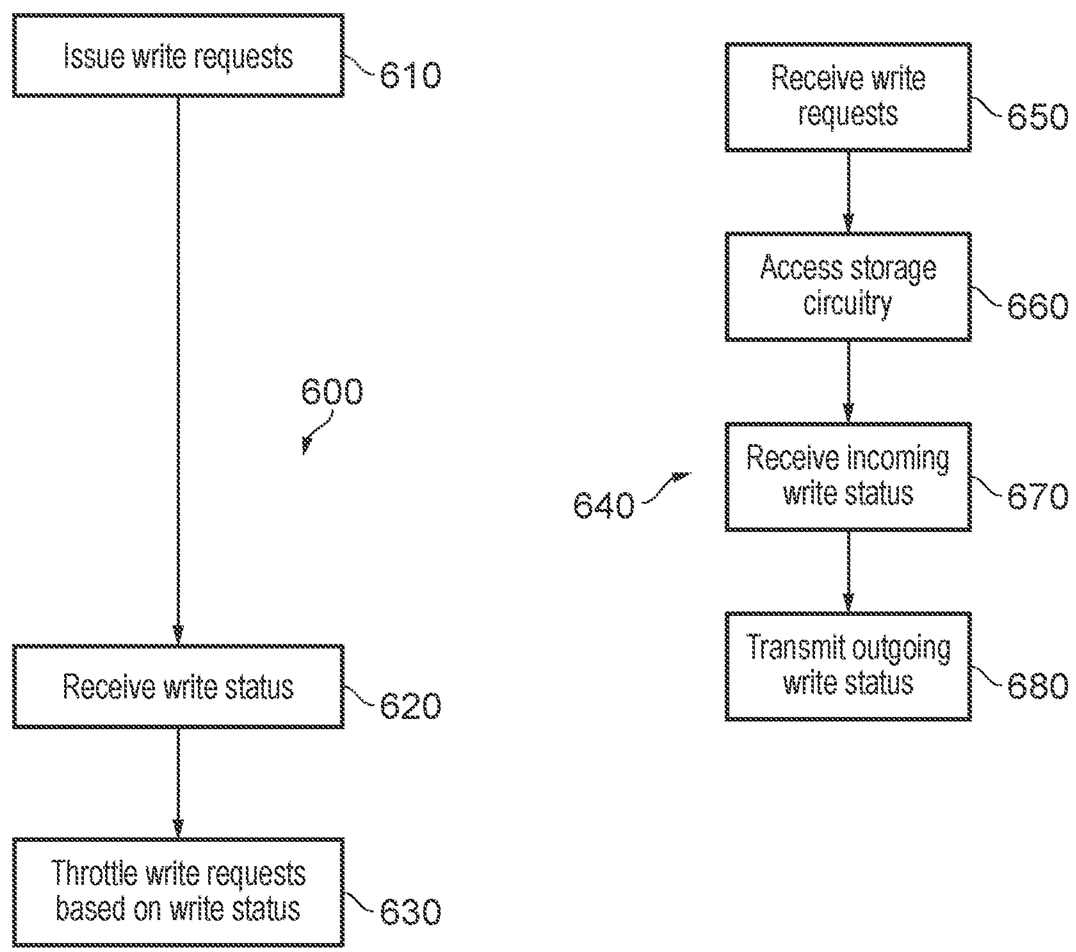
FIG. 6 illustrates in the form of two flow charts, the process performed by each of the requester node, and home node, in accordance with some embodiments.

FIG. 6 illustrates, in the form of two flow charts 600, 640, the process performed by each of the requester node 105, and home node 110. At a step 610, the requester node 105 issues write requests. At step 620, a write status is received by the requester node 105. This write status refers to the busyness level of the slave node 115 to which the request was issued. Then, at step 630, write requests issued by the requester node 105 are throttled based on this write status that is received. For instance, if the write status indicates that the request node is busy, then throttling increases. If the write status indicates that the request node is not busy, then throttling decreases. This way, the throttling increases with reference to the busyness. Flowchart 640 illustrates the corresponding process that occurs at the home node. At a step 650 (and in response to the issuing of the write request by the requester node 105), write requests are received from the requester node. At a step 660, storage circuitry (e.g. a slave node) is accessed based on each received request. At a step 670, incoming write statuses are received from the slave node 115. At step 680, outgoing write statuses are transmitted back to the requester node. The write statuses are produced based on the operating mode and the incoming write status that is received from the slave node at 670. This selection process is indicated in more detail with respect to FIG. 5.

Although FIG. 6 illustrates a process of determining the busyness with respect to write operations, a similar process may be used in order to determine busyness levels with regards to read operations. In this way, it is possible to throttle read requests and write requests separately—e.g. by throttling the write request based on the write status and the read request based on the read status.

The above description indicates a mechanism in which the requester node can be made aware of the busyness level of slave nodes even in respect of write requests. It makes it possible for the requester node to throttle the requests that it is issuing in order to help contribute to less congested slave node. This, in turn, means that bandwidth can be used more efficiently by avoiding the need to transmit data and request back to the request node 105 when slave nodes 115 and/or home nodes 110 become overly congested.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A request node comprising:

request circuitry to issue write requests to write to storage circuitry and read request to read from the storage circuitry, wherein the write requests and the read requests are issued to the storage circuitry via a coherency node that is responsible for maintaining coherency of data throughout an interconnected system comprising the request node and the storage circuitry;

status receiving circuitry to receive a write status from the coherency node comprising a write busyness field indicating a number of write operations being processed at the storage circuitry on behalf of a plurality of request circuits including the request circuitry and to receive a read status from the coherency node comprising a read busyness field indicating a number of read operations being processed at the storage circuitry on behalf of the plurality of request circuits including the request circuitry; and throttle circuitry to throttle a rate at which the write requests are issued to the storage circuitry in dependence on the number of write operations being processed at the storage circuitry on behalf of the plurality of request circuits as indicated in the write busyness field, wherein the throttle circuitry is configured to throttle, independently of the rate at which the write requests are issued and in dependence on the number of read operations being processed at the storage circuitry on behalf of the plurality of request circuits as indicated in the read busyness field, a rate at which the read requests are issued to the storage circuitry.

2. The request node according to claim 1, wherein the number of write operations is determined within a window of time.

3. The request node according to claim 1, wherein the request circuitry is adapted to issue each of the write requests to one of a plurality of storage circuitries;

the status receiving circuitry is adapted to receive a plurality of write statuses from the storage circuitries; and the throttle circuitry is adapted to throttle a rate at which the write requests are sent to each of the storage circuitries in dependence on a corresponding one of the write statuses.

4. The request node according to claim 1, wherein the request circuitry is adapted to issue each of the read requests to one of a plurality of storage circuitries;

the status receiving circuitry is adapted to receive a plurality of read statuses from the storage circuitries; and the throttle circuitry is adapted to throttle a rate at which the read requests are sent to each of the storage circuitries in dependence on a corresponding one of the read statuses.

5. The request node according to claim 1, wherein:

the write busyness field takes a first value when the number of write operations being processed at the storage circuitry exceeds a write busyness threshold and the write busyness field takes a second value when the number of write operations being processed at the storage circuitry does not exceed the write busyness threshold; and the read busyness field takes the first value when the number of read operations being processed at the storage circuitry exceeds a read busyness threshold and the read busyness field takes the second value when the number of read operations being processed at the storage circuitry does not exceed the read busyness threshold.

6. The request node according to claim 1, wherein:

the throttle circuitry is responsive to the write status indicating that the number of write operations being processed at the storage circuitry on behalf of the plurality of request circuits has increased, to decrease the rate at which the write request are issued; and the throttle circuitry is responsive to the read status indicating that the number of read operations being processed at the storage circuitry on behalf of the plurality of request circuits has increased, to decrease the rate at which the read request are issued.

7. A method comprising:

issuing write requests to write data to storage circuitry and read requests to read data from the storage circuitry, wherein the write requests and the read requests are issued to the storage circuitry via a coherency node that is responsible for maintaining coherency of data throughout an interconnected system comprising the request node and the storage circuitry;

receiving a write status from the coherency node comprising a write busyness field indicating a number of write operations being processed at the storage circuitry on behalf of a plurality of request circuits including the request circuitry;

receiving a read status from the coherency node comprising a read busyness field indicating a number of read operations being processed at the storage circuitry on behalf of a plurality of request circuits including the request circuitry;

throttling a rate at which the write requests are issued to the storage circuitry in dependence on the number of write operations being processed at the storage circuitry on behalf of the plurality of request circuits as indicated in the write busyness field; and throttling, independently of the rate at which the write requests are issued and in dependence on the number of read operations being processed at the storage circuitry on behalf of the plurality of request circuits as indicated in the read busyness field, a rate at which the read requests are issued to the storage circuitry.

8. The coherency node according to claim 7, wherein the number of write operations is determined within a window of time.

9. A coherency node configured to be responsible for maintaining coherency of data throughout an interconnected system comprising a request node and storage circuitry, the coherency node comprising:

access circuitry to receive a write request from the request node to write to the storage circuitry, to receive a read request from a request node to read from storage circuitry, to access the storage circuitry to write to the storage circuitry, and to access the storage circuitry to read from the storage circuitry;

receive circuitry to receive, from the storage circuitry, an incoming write status comprising a write busyness field that indicates a number of write operations being processed at the storage circuitry on behalf of a plurality of requesters including the request node and to receive, from the storage circuitry, an incoming read status comprising a read busyness field that indicates a number of read operations being processed at the storage circuitry on behalf of the plurality of requesters; and transmit circuitry to transmit an outgoing write status to the request node based on the incoming write status and to transmit an outgoing read status to the request node based on the incoming read status.

10. The coherency node according to claim 9, wherein the incoming write status is transmitted as part of a response to the write request.

11. The coherency node according to claim 9, comprising:

track circuitry to track a progress of write operations to write to the storage circuitry issued by the coherency node, wherein the transmit circuitry is dynamically controllable to operate in a plurality of write operation transmission modes;

in a first of the write operation transmission modes, the transmit circuitry is adapted to transmit the incoming write status as the outgoing write status; and in a second of the write operation transmission modes, the transmit circuitry is adapted to transmit an indication of the write operations to write to the storage circuitry issued by the coherency node as the outgoing write status.

12. The coherency node according to claim 11, wherein in a third of the write operation transmission modes, the transmit circuitry is adapted to transmit an average based on: the write operations to write to the storage circuitry issued by the coherency node and the write operations being processed by the storage circuitry, as the outgoing write status.

13. The coherency node according to claim 11, wherein in a fourth of the write operation transmission modes, the transmit circuitry is adapted to transmit an indication of the highest of: the write operations to write to the storage circuitry issued by the coherency node and the write operations being processed by the storage circuitry, as the outgoing write status.

14. The coherency node according to claim 9, wherein the incoming read status is transmitted as part of a response to the read request.

15. The coherency node according to claim 9, comprising: track circuitry to track a progress of read operations to read from the storage circuitry issued by the coherency node, wherein the transmit circuitry is dynamically controllable to operate in a plurality of read operation transmission modes;

in a first of the read operation transmission modes, the transmit circuitry is adapted to transmit the incoming read status as the outgoing read status; and in a second of the read operation transmission modes, the transmit circuitry is adapted to transmit an indication of the read operations to read from the storage circuitry issued by the coherency node as the outgoing read status.

16. The coherency node according to claim 15, wherein in a third of the read operation transmission modes, the transmit circuitry is adapted to transmit an average based on: the read operations to read from the storage circuitry issued by the coherency node and the read operations being processed by the storage circuitry, as the outgoing read status.

17. The coherency node according to claim 15, wherein in a fourth of the read operation transmission modes, the transmit circuitry is adapted to transmit an indication of the highest of: the read operations to read from the storage circuitry issued by the coherency node and the read operations being processed by the storage circuitry, as the outgoing read status.

18. The request node according to claim 8, wherein:

the write busyness field takes a first value when the number of write operations being processed at the storage circuitry exceeds a write busyness threshold and the write busyness field takes a second value when the number of write operations being processed at the storage circuitry does not exceed the write busyness threshold; and the read busyness field takes the first value when the number of read operations being processed at the storage circuitry exceeds a read busyness threshold and the read busyness field takes the second value when the number of read operations being processed at the storage circuitry does not exceed the read busyness threshold.

19. A method for use with a coherency node that maintains coherency of data throughout an interconnected system comprising a request node and storage circuitry comprising:

receiving a write request from the request node to write to the storage circuitry;

receiving a read request from the request node to read from the storage circuitry;

accessing the storage circuitry to write to the storage circuitry;

accessing the storage circuitry to read from the storage circuitry;

receiving, from the storage circuitry, an incoming write status comprising a write busyness field that indicates a number of write operations being processed at the storage circuitry on behalf of a plurality of requesters including the request node;

receiving, from the storage circuitry, an incoming read status comprising a read busyness field that indicates a number of read operations being processed at the storage circuitry on behalf of the plurality of requesters;

transmitting an outgoing write status to the request node that indicates the number of write operations being processed at the storage circuitry on behalf of the plurality of requesters;

transmitting an outgoing read status to the request node that indicates the number of read operations being processed at the storage circuitry on behalf of the plurality of requesters.

* * * * *